April 9, 1968  J. G. MORROW  3,376,981
CRANE DRIVE SYSTEM

Filed Dec. 6, 1965  3 Sheets-Sheet 2

INVENTOR
James G. Morrow
BY
ATTORNEY

INVENTOR
James G. Morrow
BY Robert K. Foley
ATTORNEY 3,376,981
CRANE DRIVE SYSTEM
James G. Morrow, Manitowoc, Wis., assignor to Manitowoc Engineering Corporation, Manitowoc, Wis., a corporation of Wisconsin
Filed Dec. 6, 1965, Ser. No. 511,844
15 Claims. (Cl. 212—38)

ABSTRACT OF THE DISCLOSURE

This invention relates a drive connection especially adapted for use in a crane which undergoes both swinging and hoisting movement. Suitable variable output torque converters are disposed in operative relation between a prime mover in the swing and hoist mechanisms. There is provided means for controlling the variable output torque converters and means for clutching and declutching the swing and hoist loads. One or more, but not all, of the swing and hoist torque converters and clutch devices is manually or mechanically actuated while the remainder are fluid pressure actuated. In one embodiment of the invention, the hoist torque converter is manually controlled while the swing torque converter, swing clutch, and hoist clutch are fluid operated. In a second embodiment of the invention, the hoist clutch is manually controlled while the swing torque converter, the hoist torque converter and the swing clutch are fluid actuated. In a third embodiment, the hoist clutch and the hoist torque converter are manually actuated, while the swing torque converter and the swing clutch are fluid actuated.

---

This invention relates, generally, to drive systems for machines such as cranes having excavating attachments like shovels, clamshells, draglines or the like attached thereto.

More particularly, the present invention relates to an improved drive system for operating such machines, wherein controllable, variable drive mechanisms are employed to power the hoist assembly and the swing assembly thereof.

It is customary, in crane type excavators, to provide a single engine to drive the several functions of the machine, the power being transmitted and controlled by means of friction clutch devices. In such conventional systems, the speed of the engine is customarily regulated and maintained substantially constant by varying the engine torque output to compensate for load changes. Accordingly, it is necessary for the clutch devices to slip while accelerating a load, resulting in the continual wear of the friction linings and requiring frequent adjustment and periodic replacement. This is particularly true of the swing clutch devices of the swing assembly of the machine, which are usually employed to reverse the rotation of the crane by application of the appropriate clutch device to first decelerate the swing of the machine and then to accelerate the swing thereof in the opposite direction. During such a reversal of the swing of the machine, it is necessary that the clutch devices slip until the crane reaches its governed swing speed, resulting in severe heating and wear of the friction surfaces of the swing clutch devices.

A second drawback in the conventional type, single engine crane drive systems lies in the inherent inability of a single engine to maintain a given speed under changing load due to governor droop. Thus, for example, an engine laboring under a hoisting load will be further slowed by the application of a swing load, with the result that the cycle time is considerably greater than it would be if the swing speed of the machine were not reduced by the hoisting load thereof.

An additional drawback in the conventional drive system for such machines results from driving both the swing and hoist funtions from the same power source, whereby the speeds of these functions are not adjustable with respect to each other. As a result, it frequently happens that the speed of the hoist function is such that the load is raised to the maximum of the machine before the desired angle of swing is completed. It is then necessary to hold the load elevated with a brake until the swing is completed. Power is obviously wasted in such a cycle because the load is raised faster than necessary. The converse of this also occurs in some operations, i.e., the swing of the machine must be delayed until the hoist has lifted the load sufficiently to clear a high spoil pile, for example. Such a delay results in cycle time wasted with a resulting loss of machine efficiency.

In U.S. Patent 3,088,564, there is illustrated, described, disclosed and claimed a drive system for a machine such as an excavator crane which comprises a pair of separate engines, one for driving the swing function and the other for driving the hoist function of the machine, independently of each other, through appropriate fluid pressure responsive swing and hoist clutch devices which are engageable and operable in response to a given fluid pressure range, and apparatus connected to a throttle for each of the engines and operable in response to fluid pressure ranges which are higher than the pressure range of the respective clutch device in a manner which enables the clutch devices to be engaged prior to the advancement of the respective engine throttle. By thus variably controlling the torque output of the swing and hoist engines, through the corresponding fluid pressure-actuated throttles, relative to the engagement of the respective fluid pressure-actuated clutch devices, the disadvantages and objections of the conventional type drive system, as mentioned above, are overcome.

The drive system disclosed in U.S. Patent 3,221,896, also contemplates the elimination of the disadvantages and objections of the customary or conventional types of drive systems, as mentioned above, and differs from the drive system disclosed in U.S. Patent 3,088,564 by employing a pair of controllable, variable torque converters, one for the swing function and the other for the hoist function, which may be driven by a single source of power, such as a common engine or a plurality of sources of power, such as a pair of engines; and fluid pressure-actuated apparatus which independently, separately and effectively varies the torque output from the variable torque converters. This drive system also employs appropriate fluid pressure-actuated swing and hoist clutch devices which are responsive to given fluid pressure ranges, with the apparatus for controllably varying the resulting output of the respective torque converters being responsive to higher pressure ranges to enable to clutch devices to be engaged prior to an appreciable increase in the torque output of the respective torque converter, while being able to maintain the output speed of the power source substantially constant.

The drive system of the instant invention is substantially the same in construction and operation to that disclosed in U.S. Patent 3,221,896, except that, in the instant invention, the torque converters and swing and hoist clutch devices are not all fluid pressure-actuated. The present invention contemplates the manual or mechanical actuation of one or more, but not all, of the torque converters and clutch devices.

Accordingly, it is an object of the present invention to provide a drive system for excavator cranes wherein the slipping of friction clutch devices and the consequent wear there of is greatly reduced.

It is also an object of this invention to provide a drive system for excavator cranes wherein the swing speed of the crane is unaffected by the hoisting load thereof.

Another object of this invention is to provide a drive system for cranes wherein the swing and hoisting speeds thereof are individually variable.

Still another object of this invention is to provide apparatus for coordinating a control for a friction clutch device with the load thereon.

An additional object of this invention is to provide a drive system for machinery such as excavating cranes wherein the swing and hoist functions are each operated by assemblies which include clutch devices that are driven by torque converters, and there is employed therewith manual or mechanical, or fluid pressure-actuated apparatus which enables the clutch devices to be engaged prior to any appreciable increase of the torque output of the respective torque converters so that slippage, wear and overheating of the clutch devices are substantially eliminated.

A further abject of the present invention is to provide such a drive system wherein one or more, but not all, of the swing and hoist torque converters and clutch devices is manually or mechanically actuated, while the others are fluid pressure-actuated.

It is still another object of the present invention to provide a drive system for machinery, such as excavating cranes or the like; wherein the hoist and swing functions thereof are operated by assemblies each of which includes a torque converter and a clutch device, with apparatus that enables the operating cycle time of the machinery in performing the hoist and swing functions to be decreased, thereby resulting in a desired increase in the performance and production of the machine.

Other objects and important features of this invention will be apparent from a study of the specification following taken with the drawing, which together show, describe, disclose and illustrate the preferred embodiment together with a number of modifications of the invention and what are now considered to be the best modes of practicing the principles thereof. Still other embodiments or modifications may be suggested to those having benefit of the teachings herein, and such other embodiments or modifications are intended to be reserved as they fall within the scope and breadth of the subjoined claims.

Figure 1:
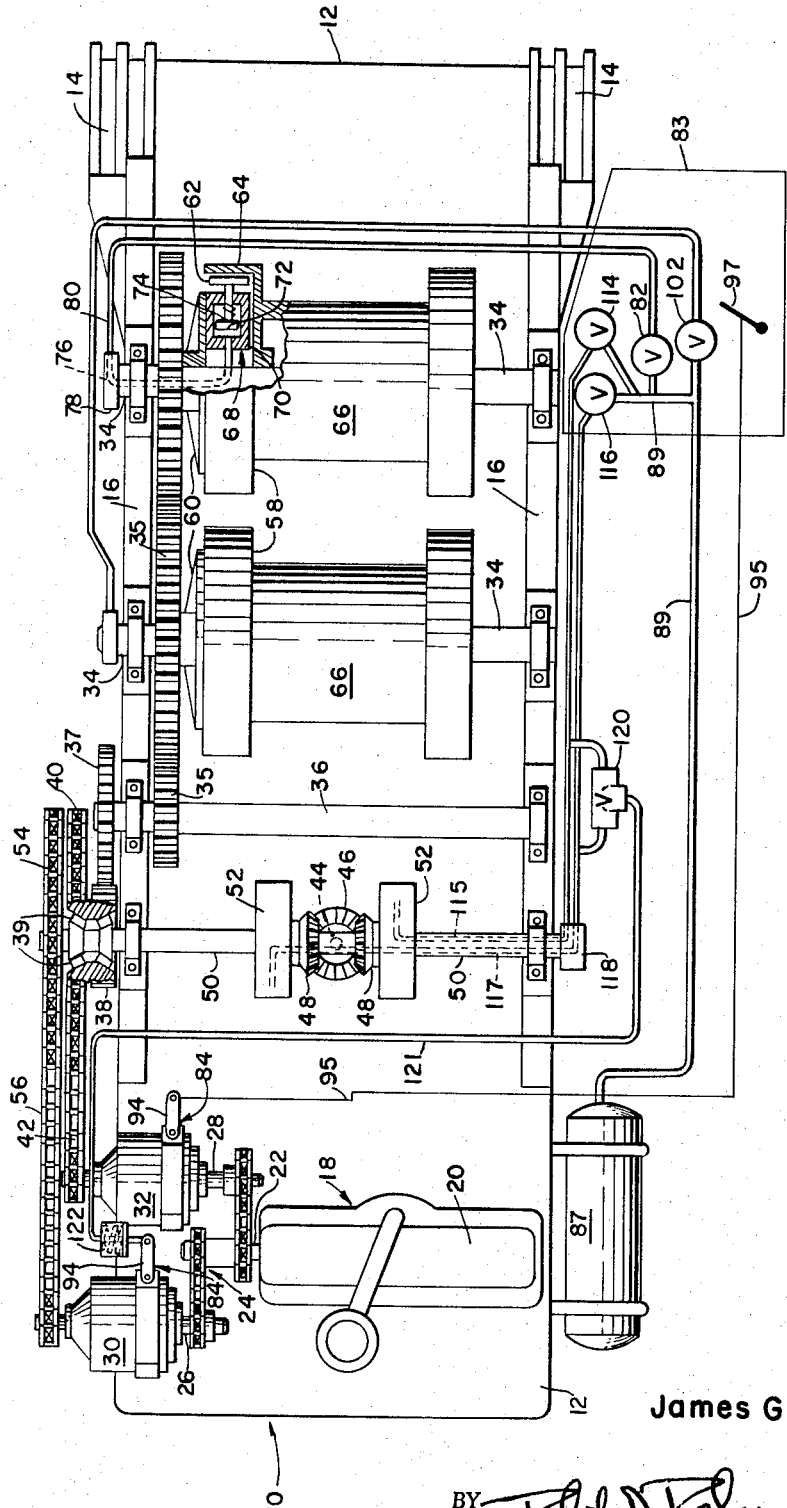
FIGURE 1 is a top plan view of a part of a machine, such as the upper works of an excavating crane, having the drive system of this invention employed therein.

Referring to the drawings, there is illustrated in FIGURE 1 a part 10 of a machine, such as the upper works of a crane assembly which is suitable for having various types of excavator mechanisms, such as booms, dipper sticks, shovels, drag lines, clam shells or the like, attached thereto in a manner to effectively accomplish any number of desired or predetermined functions.

The upper works 10 of the machine include a bed or platform 12 which may be rotatably mounted on rollers in a manner as more fully described and disclosed in the above identified U.S. Patents 3,088,564 and 3,221,896, wherein the rollers ride on an upper surface of the roller path which is defined by a ring gear to enable swinging of the upper works 10 about a generally vertically extending axis. Normally, a kingping is centrally fixed in the ring gear and serves to keep the upper works 10 in a centered position. A swing pinion engages internal gear teeth in the roller path to power the upper works 10 through the swinging movement thereof.

The rotating bed 12 may be provided with a pair of trifurcated boom hinge members 14 in its forward end; stiffeners in the form of side frames 16 extending along each side of the bed 12 for supporting the several shafts which comprise the operating machinery; and supports located adjacent to the rear of the bed 12 for supporting a source of power 18 for driving the machine hoist assembly and swing assembly, in a manner to be described in more detail hereinafter.

In the preferred embodiment of the instant invention, as illustrated in FIGURE 1 of the drawing, the source of power 18 includes a single engine 20, normally of the internal combustion type, which has the output shaft 22 thereof connected to a split drive gearing arrangement 24 having a pair of output shafts 26 and 28 drivingly connected to the input side of a pair of output controllable and variable, torque converters 30 and 32, respectively.

The hoist assembly of the machine includes a pair of drum shafts 34 journaled in pillow blocks mounted on the side frames 16 of the bed 12 and driven through suitable gears 35 from a counter shaft 36 which is similarly mounted on the side frame 16 and which in turn is driven through suitable gearing 37 from a pinion 38 that is integral with a sprocket 40. The sprocket 40 is driven by a chain 42 which in turn is driven from the output side of the torque converter 32, which may be called the hoist torque converter.

The swing assembly of the machine may include, as more fully described and disclosed in the above identified U.S. Patent 3,088,564, the aforementioned swing pinion which is mounted on a swing pinion shaft (not shown) and is driven through suitable gearing from a vertical swing shaft 44. Mounted at the top of the swing shaft 44 is a swing bevel gear 46 which engages, and may be driven by either one of, a pair of bevel gears 48 that are rotatably mounted on a horizontal swing drive shaft 50. The bevel gears 48 are driven by a pair of swing clutch devices 52 which are also mounted on the drive shaft 50 and are driven thereby. The drive shaft 50 extends outwardly of the sprocket 40 and carries a sprocket 54 which is driven by a chain 56 from the output side of the torque converter 30, which may be called the swing torque converter. As disclosed in the above mentioned U.S. Patent 3,221,896, the other end of the swing shaft 44 is provided with a drive pinion for driving the swing pinion through suitable gearing.

As shown in FIGURE 1, the sprocket 40 and the pinion 38 are carried on suitable anti-friction bearings, such as the tapered roller bearings 39, mounted on the horizontal swing drive shaft 50 so that the sprocket 40 cannot drive the drive shaft 50, but is merely positioned thereby. This arrangement is not a necessary part of the instant invention, but is merely a convenient expedient for the conversion of a conventional machine to take advantage of the instant invention. In this respect, it is to be noted that in a conventional machine, the pinion 38 is normally driven by the drive shaft 50 which, in turn, is driven by a single sprocket, and thus in a conventional machine all of the machinery is driven from the drive shaft 50.

The source of power 18 may be provided with a conventional governor, including a throttle lever or other suitable means (not shown) so that the speed of the engine 20 may be varied but yet selectively maintained at a constant operating speed.

Fluid pressure-actuated drum clutch devices 58 are provided, each of which include a clutch spider 60 carried by each of the drum shafts 34 and rotatably driven thereby. Each of the clutch spiders 60 drives a clutch shoe 62 carried thereby in a conventional manner such that the respective clutch shoe 62 may be caused to engage a clutch drum 64 carried by a cable drum 66 which is rotatably mounted on each of the drum shafts 34. It will be readily seen that when the clutch shoe 62 is caused to engage the clutch drum 64, the cable drum 66 will turn with the respective drum shaft 34.

For the sake of brevity, the operation of only one of the drum clutch devices 58 of the hoist assembly will be described, and it is to be noted that the respective clutch shoe 62 is connected by suitable linkage to a fluid pressure motor 68, shown schematically in FIGURE 1, which is carried by the clutch spider 60 and may comprise a cylinder 70 having a piston 72 therein. A biasing member 74 in the form of a spring is provided to retract the clutch shoe 62 when the fluid pressure is not being applied to the piston 72 to engage the clutch device 58.

The fluid pressure to operate the clutch device 58 is supplied through an axial passage 76 in the respective drum shaft 34, a rotary joint 78 and a line 80 from a modulating control valve 82 at the operator's station or pilot house 83. The fluid under pressure is supplied to the control valve 82 from a suitable fluid pressure source 87 through conduit means 89, as shown in FIGURE 1.

While only the front cable drum 66 is shown and described in detail, it should be understood that the rear cable drum 66 is similar in construction and operation and is controlled by a similar, but separate, modulating control valve 102.

As further shown in FIGURE 1, the controllable, variable torque converters 30 and 32 are each provided with control apparatus 84 for variably controlling the output torque thereof. As disclosed in U.S. Patent 3,221,896, the apparatus 84 includes the sleeve member which is axially movable or slidable, relative to the respective torque converter, over the outside diameter of an impeller. By moving or sliding the sleeve member, it is possible to regulate the flow of fluid between the impeller and the turbine of the respective torque converter and thereby controllably vary the torque output thereof, while the input speed from the source of power 18 is maintained substantially constant. The apparatus 84 also includes an actuating device in the form of a pivotally mounted yoke member 94 which engages pins on each of the sleeve members to axially slidably or movably position the respective sleeve member relative to the impeller and turbine of the respective torque converter 30 or 32.

The yoke member 94 of the control apparatus 84 for the hoist torque converter 32 is operated mechanically by any suitable mechanical system or linkage, such as a Bowden-type cable 95 which preferably is manually actuatable by a lever 97 located in the pilot house 83 within convenient reach of the operator. In order to avoid excessive wear of the drum clutch devices 58 for the hoist assembly, it is noted that the operator preferably would actuate the respective fluid pressure motor 68 by operating the control valve 82 or 102 to engage the respective hoist assembly clutch device 58 prior to the manual actuation, via the cable 95 and lever 97, of the control apparatus 84 for the hoist torque converter 32 or before the torque output of the hoist torque converter 32 has reached an appreciable amount.

The yoke member 94 of the control apparatus 84 for the swing torque converter 30 is fluid pressure-operated by a fluid pressure motor 122 which enables the torque output of the swing torque converter 30 to be increased as a result of the movement of the yoke member 94 and thus movement of the torque converter sleeve member upon application of fluid pressure to the motor 122. The fluid pressure motor 122 is constructed and operates in accordance with the disclosure of the U.S. Patent 3,221,896. Briefly, the motor 122 comprises a bias in the form of a spring which urges the piston of the motor into a position to increase the work output of the torque converter when fluid pressure on the piston is reduced. The motor 122 is connected by a fluid line 121 to a balancing or shuttle valve 120 of conventional construction which in turn is connected between a pair of modulating valves 114, 116 that are connected to the fluid pressure source 87 by the conduit means 89. The modulating valves 114, 116 are also connected through suitable piping and duplex rotary seal 118 to a pair of passages 115 and 117, respectively, in the swing drive shaft 50 and thence to fluid motors incorporated in the swing clutch devices 52, respectively.

Because both swing clutch devices 52 are connected to the same swing torque converter 30, it is necessary that the motor 122 be operable from either of the modulating valves 114 or 116. It is necessary, therefore, to provide means to prevent feedback from the control line 121, when it is charged from one of the modulating valves 114 or 116, from entering the other clutch pressure line and thus engaging both of swing clutch devices 52, 52. The shuttle valve 120 serves as a convenient expedient for such feedback prevention. The construction and operation of the shuttle valve is fully disclosed in Patent 3,221,896. Briefly, the shuttle valve 120 comprises a cylinder having an inlet passage at each end connected to the modulating valves 114 and 116, respectively. Each end of the shuttle valve cylinder terminates in a valve seat for a shuttle or piston which is slidably mounted in the cylinder. The shuttle valve cylinder is provided with an outlet passage in its center portion which is connected to the control line 121 leading to the fluid motor 122 for the swing torque converter 30. It is apparent that when only one of the modulating valves 114 or 116 is opened to engage one of the swing clutch devices 52, fluid under pressure will pass from the respective modulating valve to the respective end of the shuttle valve cylinder and will move the valve shuttle against the opposite inlet port to prevent the passage of fluid to the other swing clutch device 52. Fluid under pressure, therefore, will flow from one of the shuttle valves 114 or 116 to one of the swing clutch devices 52 without engaging the other of the clutch devices 52, and also will flow into the shuttle valve 120 to operate the fluid motor 122 via the fluid line 121 to increase the torque output of the swing torque converter 30. In the event that both modulating control valves 114, 116 are opened at the same time, the one which is opened to the greater pressure setting will determine the position of the shuttle in the shuttle valve cylinder and thus the torque output of the swing torque converter 30.

An essential feature of the present invention relates to enabling the fluid pressure motors (not shown) for the swing clutch devices 52 to be responsive to a lower range of control pressures than the swing torque converter fluid pressure motor 122. This may be accomplished through the proper selection of springs and cylinder sizes and/or through the use of a suitable linkage (not shown). Because the swing clutch devices 52 respond to pressures which are less than those required to actuate the control apparatus 84 and thus the swing torque converter 30, the clutch devices 52 will be engaged by increasing control pressure before the output torque of the swing torque converter 30 increases by an appreciable amount. Since at this point the source of power 18 is at a substantially constant speed, and the torque output from the swing torque converter is very low, engagement or application of the swing clutch devices 52 is accomplished with a minimum of clutch wear due to the absence of high speed, high torque slippage.

As fluid pressure in the control system is further increased by the operator through the modulating valves 114 or 116, the torque converter fluid pressure motor 122 will actuate the yoke member 94 and position the torque converter sleeve member to cause the outward torque of the swing torque converter 30 to increase and consequently the torque ultimately available at the swing shaft 44 to increase. The same pressure, however, is available at the swing clutch devices 52 to permit them to transmit more torque. Thus, the swing clutch devices 52 are always capable of transmitting the torque which is transmitted to them.

While clutch slippage is kept to a minimum by the present drive system, it should be noted that at light loads the swing clutch devices 52 may be engaged very gently with consequent slippage, when it is desired to accelerate a load extremely slowly. However, since the slippage occurs only at light loads and slow relative speeds, the clutch life is not appreciably affected.

The hoist modulating valves 82 and 102 as well as the swing modulating valves 114 and 116, may be conveniently arranged in associated pairs to be controlled by a single actuator (not shown) which will operate either valve depending upon the direction of motion from a neutral position, thereby permitting control in either direction with a single lever for each pair of valves.

In actual practice it has been found that a Midland valve, No. XN3440, manufactured by Midland-Ross Corporation of Owosso, Michigan, works satisfactorily as the control valves 82, 102, 114 and 116, and while these valves have been illustrated in schematic manner in the drawing, it is to be understood that these valves may be of the type such as that identified above or of any other suitable or conventional type.

All of the control or modulating valves, 82, 102, 114 and 116 may be supplied, if desired, from the common source 87 of fluid under pressure which may be in the form of pressure fluid from an engine driven source (not shown) which may be provided with a distribution manifold to which each valve is connected.

Referring now to the modified form of the instant invention shown in FIGURE 2, it is substantially similar in construction and operation to the embodiment of FIGURE 1, except for the differences described hereinafter. Instead of being mechanically or manually actuated, the member 94 of the control apparatus 84 for the hoist torque converter 32, is connected to a second fluid pressure motor 96 which is substantially the same in construction and operation to the fluid pressure motor 122 for the swing torque converter 30. The fluid motor 96 is connected by a fluid line 100 to a modulating valve 85 which is in turn connected by the conduit means 89 to the fluid pressure source 87.

Figure 2:
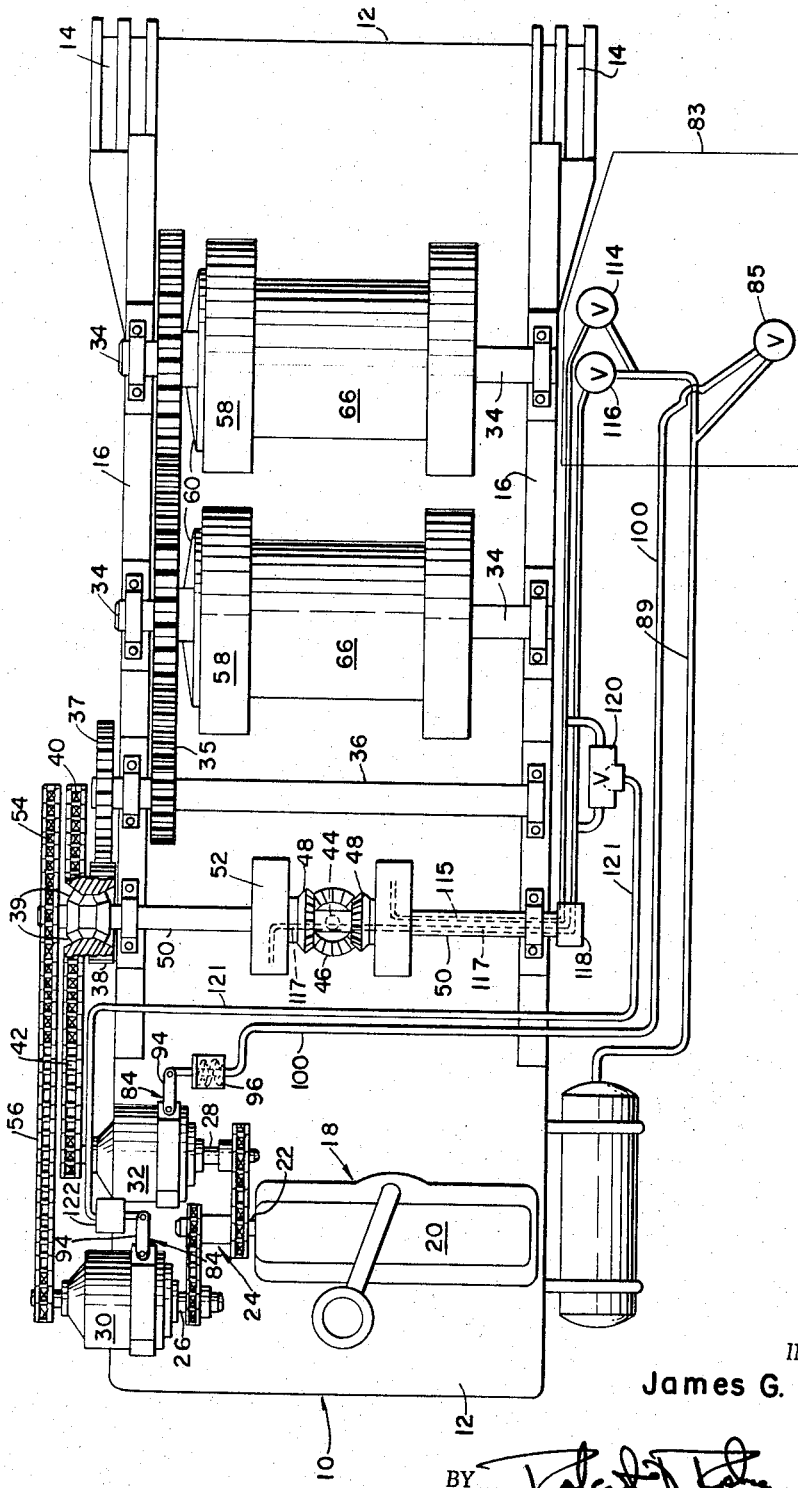
FIGURE 2 is a view similar to FIGURE 1 showing a modified form of the actuating apparatus for the instant drive system.

In the modified apparatus shown in FIGURE 2, the clutch devices 58 for the drum 66 of the hoist assembly are not fluid operated, but instead may be manually or mechanically actuated by any suitable or conventional control mechanisms or linkages or the like (not shown) which may be in turn operated or actuated by levers or the like (not shown) located within easy reach of the operator in the pilot house 83. It will be readily seen, therefore, that in the actuating apparatus for the instant drive system as shown in FIGURE 2, the swing torque converter 30 and swing clutch devices 52 are fluid pressure-actuated, the hoist torque converter 32 is fluid pressure-operated, and the clutch devices 58 for the drums 66 of the hoist assembly are mechanically or manually actuated. In this embodiment or modification, the operator would manually or mechanically engage the hoist clutch devices 58 before the control apparatus 84 for the hoist torque converter 32 was fluid-actuated by the fluid motor 96, thereby minimizing the wear on the clutch devices 58.

Figure 3:
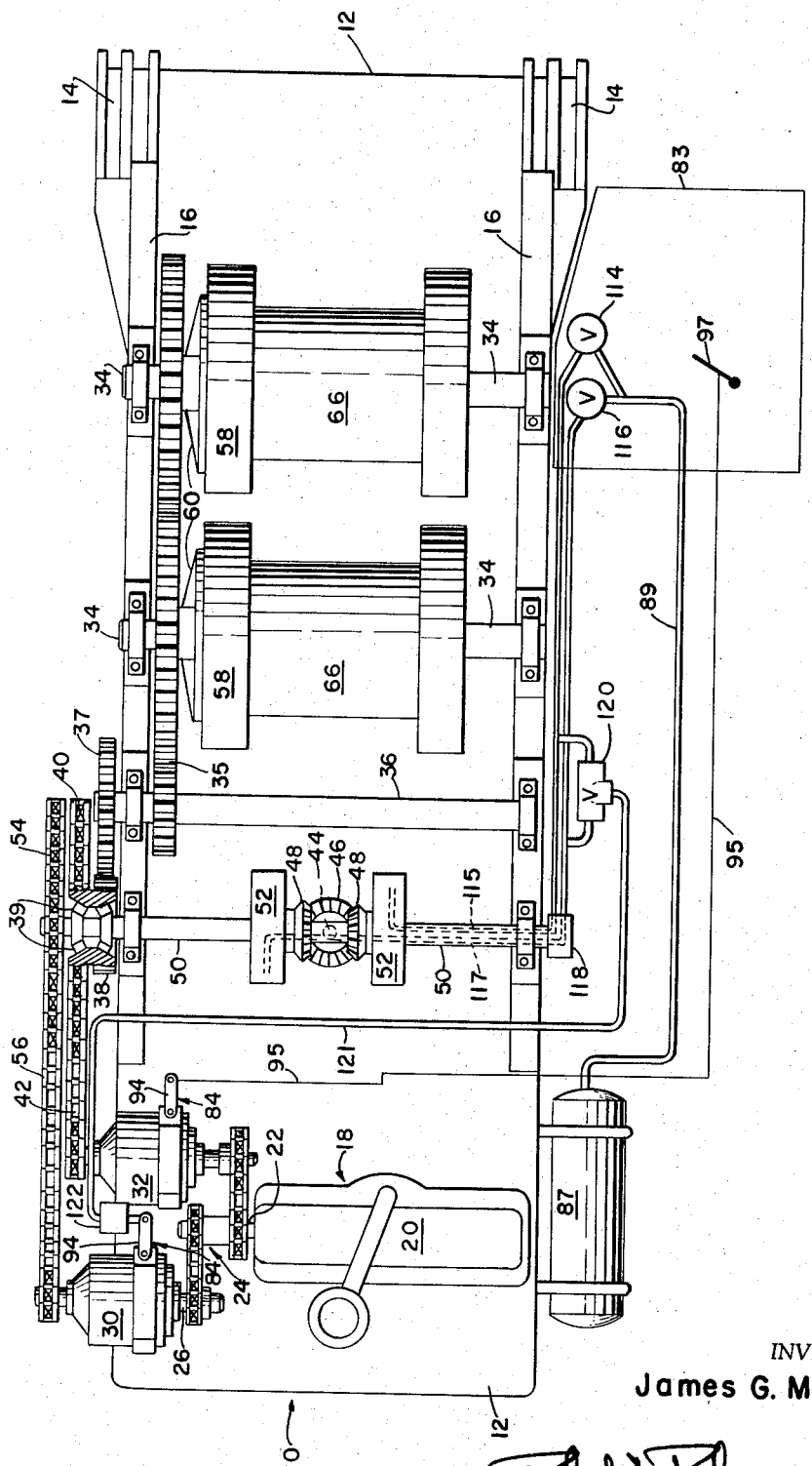
FIGURE 3 is a view similar to FIGURE 1 showing a further modified form of the actuating apparatus for the instant drive system.

FIGURE 3 discloses a further modification of the actuating apparatus for the instant drive system shown in FIGURE 1. The modified form of the apparatus shown in FIGURE 3 is substantially similar in construction and operation to that shown in FIGURE 2, with the exception that both the hoist torque converter 32 and the hoist clutch devices 58 are manually or mechanically actuated, while the swing torque converter 30 and swing clutch devices 52 are fluid pressure-actuated. As in the embodiment of FIGURE 1, the yoke member 94 of the control apparatus 84 for the hoist torque converter 32 is connected to a Bowden-type wire or cable 95 which in turn is connected to a manually operable lever 97 located in the pilot house 83. The clutch devices 58 for the hoist assembly are mechanically or manually actuatable by any suitable or conventional mechanisms or linkages (not shown) which may be operated from control levers or the like (not shown) located in the pilot house 83. In this embodiment, the operator would mechanically engage the hoist assembly clutch devices 58 prior to mechanically actuating the control apparatus 34 for the hoist torque converter 32, thereby engaging the hoist assembly clutch devices 58 prior to a substantial torque output of the hoist torque converter 32 and thus minimizing wear on the clutch devices 58. The swing torque converter 30 and clutch devices 52 for the swing assembly would be fluid pressure-actuated in a manner substantially the same as that described with respect to the embodiment shown in FIGURE 1.

While not specifically shown in the drawings, it is to be understood that it would be within the scope of the instant invention to mechanically or manually actuate the swing torque converter 30 and/or the swing assembly clutch devices 52. The present invention contemplates a manual or mechanical actuation of any one or more, but not all, of the swing and hoist assembly torque converters and clutch devices.

As specifically disclosed in U.S. Patent 3,221,896, various modifications may be made in the drive system for the instant apparatus without departing from the present invention. For example, instead of a single engine connected to both the swing and hoist torque converters, as shown in FIGURE 1, a pair of engines may be provided which are connected to the hoist torque converter and the swing torque converter; also, a single power source may be provided which is connected to both the hoist and swing assembly converters through friction clutch devices which preferably are of the multiple disc type; and, additionally, a pair of engines may be provided which are connected to friction type clutch devices which are in turn connected to the hoist and swing assembly torque converters, with the fluid pressure operated or manually operated actuating devices being connected to the friction type clutches. It is to be noted that in each of the above modifications of the drive system, it is the torque output of the torque converters which is controllably variable in a manner which enables the associated clutch devices to be engaged prior to any appreciable increase in the torque output of the associated torque converter, and the source of power may be maintained with the output speed thereof being substantially constant.

From the foregoing, it is believed that there has been described, disclosed, illustrated and shown an improved drive system for operating a machine, such as a crane assembly having an excavator mechanism attached thereto, in which the slippage and consequent wear and overheating of the clutch devices associated therewith is minimized; in which the speed of the swing function is entirely independent and separate from the speed of the hoist function; in which the swing and hoist functions are individually and separately controlled without necessitating the inclusion of additional controls; in which the capacity of the friction clutch devices are coordinated with the requirements of the loads; and in which the cycle time for the swing and hoist functions may be substantially decreased so as to increase the operational production of the machine.

While the invention has been described, disclosed, illustrated and shown in terms of the preferred embodiment and a number of arrangements or modifications thereof, the scope of this invention should not be deemed to be limited by the embodiments, modifications and arrangements as herein shown, such other embodiments, modifications and arrangements being intended to be reserved especially if they fall within the scope of the claims here appended.

What is claimed is:

1. In an excavator crane having a power source for driving a swing assembly and a hoist assembly, each of the assemblies comprising a substantially continuously variable output torque converter driven by the power source and a friction clutch device driven by the respective torque converter, the improvement comprising, the combination with said swing and hoist assemblies of fluid pressure responsive mechanism and manually operated mechanism for enabling each clutch device to be engaged prior to any appreciable increase in the torque output of the corresponding torque converter, while the output speed of the power source is maintained substantially constant.

2. The apparatus as recited in claim 1 wherein said torque converter for said hoist assembly is structurally operatively associated with said manually operated mechanism.

3. The apparatus as recited in claim 1 wherein said clutch device for said hoist assembly is structurally operatively associated with said manually operated mechanism.

4. a crane having
a swing assembly;
a hoist assembly;
power means drivably associated with the swing assembly and the hoist assembly;
each of the assemblies comprising
 a substantially continuously variable output torque converter driven by the power means;
 a member driven by the torque converter; and
 a friction clutch device driven by the respective variable output torque converter for clutching and declutching the respective torque converter to and from the driven member;
fluid pressure responsive mechanism for controllably varying the output of at least one of the variable torque converters; and
manually operated mechanism for engaging at least one of the friction clutch devices prior to any appreciable increase in the torque output of the respective torque converter.

5. The crane of claim 4 wherein
the fluid pressure responsive mechanism comprises structure for controllably varying the output of the other torque converters.

6. The crane of claim 5 wherein
the manually operated mechanism comprises structure for engaging the other clutch device prior to any appreciable increase in the torque output of the respective torque converter.

7. The crane of claim 6 wherein the torque converter is connected to the clutch device by an endless drivable member.

8. The crane of claim 4 wherein
the manually operated mechanism comprises structure for controllably varying the output of the other torque converter.

9. The crane of claim 8 wherein
the manually operated mechanism comprises structure for engaging the other clutch device prior to any appreciable increase in the torque output of the respective torque converter.

10. A crane having
a swing assembly;
a hoist assembly;
power means drivably associated with the swing assembly and the hoist assembly;
each of the assemblies comprising
 a substantially continuously variable output torque converter driven by the power means;
 a member driven by the torque converter; and
 a friction clutch device driven by the respective variable output torque converter for clutching and declutching the torque converter to and from the driven member;
manually operated mechanism for controllably varying the output of at least one of the variable output torque converters; and
fluid pressure responsive mechanism for engaging at least one of the friction clutch devices prior to any appreciable increase in the torque output of the respective torque converter.

11. The crane of claim 10 wherein
the fluid pressure responsive mechanism comprises structures for controllably varying the output of the other variable output torque converter.

12. The crane of claim 11 wherein
the fluid pressure responsive mechanism comprises structure for engaging the other clutch device prior to any appreciable increase in the torque output of the respective torque converter.

13. A crane having
a swing assembly;
a hoist assembly;
power means drivably associated with the swing assembly and the hoist assembly;
each of the assemblies comprising
 a substantially continuously variable output torque converter device driven by the power means;
 a member driven by the torque converter; and
 a friction clutch device driven by the respective variable output torque converter for clutching and declutching the torque converter from the driven member;
manually operated mechanism for controllably varying the output of at least one of the variable output torque converter devices;
manually operated mechanism for engaging at least one of the friction clutch devices prior to any appreciable increase in the torque output of the respective torque converter; and
fluid pressure responsive mechanism for operating at least one of the other devices.

14. The crane of claim 13 wherein
the fluid pressure responsive mechanism is operatively connected to the other torque converter for controllably varying the output of the other torque converter.

15. The crane of claim 14 wherein
the manually operated mechanism comprises structure for engaging the other clutch device prior to any appreciable increase in the torque output of the respective torque converter.

References Cited
UNITED STATES PATENTS

| | | | |
|---|---|---|---|
| 2,301,957 | 11/1942 | Lang | 192—3.33 |
| 2,397,883 | 4/1946 | Peterson et al. | 192—3.33 |
| 2,618,367 | 11/1952 | Cook | 192—3.33 |
| 2,888,841 | 6/1959 | Peras | 192—3.33 |
| 3,120,896 | 2/1964 | Grall et al. | 212—38 |
| 3,221,896 | 12/1965 | Grall et al. | 212—38 |

ANDRES H. NIELSEN, *Primary Examiner.*